(No Model.)
J. R. PHELPS.
HARNESS.
No. 438,360. Patented Oct. 14, 1890.
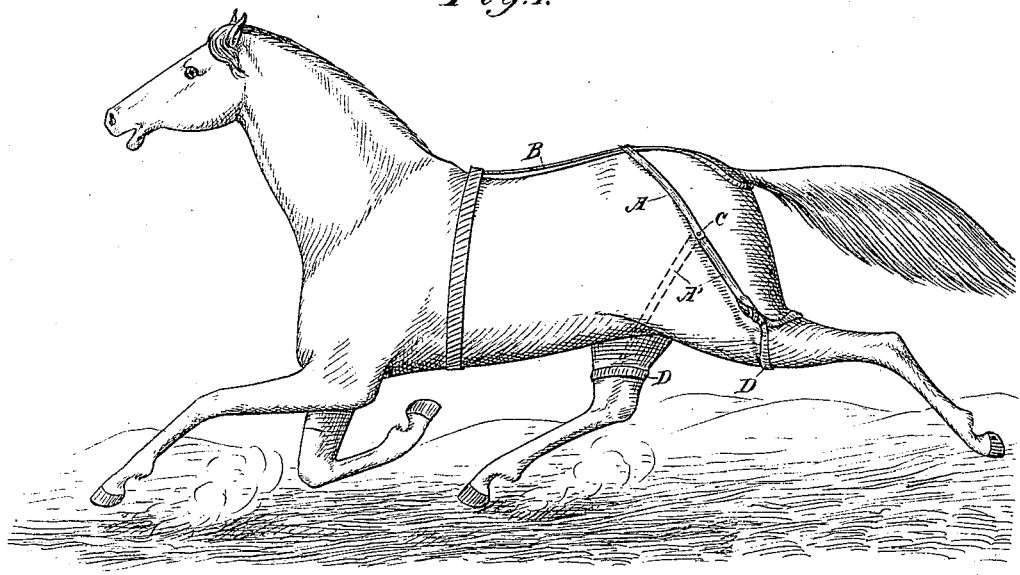
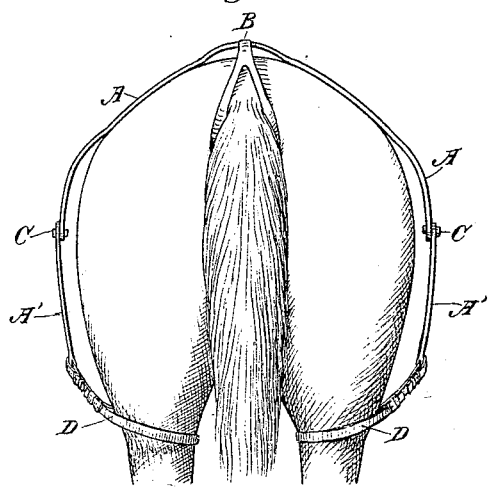
Witnesses
Geo. C. Strong
J. H. Krause
Inventor,
James R. Phelps
By Dewey & Co
Attys

UNITED STATES PATENT OFFICE.

JAMES R. PHELPS, OF SACRAMENTO, CALIFORNIA.

HARNESS.

SPECIFICATION forming part of Letters Patent No. 438,360, dated October 14, 1890.

Application filed February 12, 1890. Serial No. 340,176. (No model.)

*To all whom it may concern:*

Be it known that I, JAMES R. PHELPS, a citizen of the United States, residing at Sacramento, Sacramento county, State of California, have invented an Improvement in Spreaders for Gaiting Horses; and I hereby declare the following to be a full, clear, and exact description of the same.

My invention relates to a device which I term a "spreader." It is applicable for the purpose of giving a trotting, pacing, or running horse a proper gait, and causing him to spread the hind feet when traveling, so as not to interfere or overreach.

In consists of a frame-work supported from the back or hips of the animal and connections from said frame-work to the hind legs of the horse with such an elastic tension as will cause the animal to travel with the hind feet more widely separated than it would otherwise do.

Referring to the accompanying drawings for a more complete explanation of my invention, Figure 1 is a side view of a horse having my device attached. Fig. 2 is a rear view showing its application.

A A are two arms or branches, which may be made of steel or other suitable material, these arms being attached to a central bar B, which extends along the back of the horse, and which has its front end properly attached to the girth or surcingle, and the rear end may be connected with the crupper-strap, the object of these connections being to retain the bar in place and prevent it and the arms A from shifting or tilting.

The arms A are preferably made elastic, and are so constructed as to be supported from the hips or from the back upon each side of the backbone in such a manner as not to bring a pressure upon a delicate or tender part of the back or hips. These arms curve over the hips, as shown more plainly in Fig. 2, and have hinged or swiveled joints, as shown at C, to which the extensions A' are pivoted. These joints are so placed with reference to the hip-joints of the animal that the extensions A' will be allowed to swing forward and back, having a motion approximately parallel with the motions of the animal's legs. The length of these extensions is such as to carry their lower ends down upon each side of the animal's hind legs, and they are provided with openings or attachments for the straps D. These straps are fitted to pass around the hind legs of the animal at any suitable point and clasp the legs loosely. The straps may be properly padded or protected, so as not to chafe the legs or prevent free action of the horse in traveling. These straps may be made of elastic or non-elastic webbing or other suitable material, and are so connected with the arms A A' that they will pull upon the inside of the animal's legs, so as to cause the animal to travel with the legs farther apart than it would otherwise do.

By reason of the joint C it will be manifest that the extensions A' will be allowed to swing parallel with the movements of the legs; but at the same time the elastic tension of the arms will be maintained at all times upon the legs. These arms might be made rigid instead of elastic, and the webbing-straps D could be made elastic, so as to produce, essentially, the same results; but I have preferred to make the arms themselves elastic as being the better mechanical construction.

This device may be applied to horses without any other harness upon them and the horse turned loose and allowed to travel about the pasture at will, or it may be applied in conjunction with harness and vehicle at work on the road, the apparatus acting constantly upon the legs, so as to cause the horse to travel with the hind legs separated, so as to prevent interfering and overreaching and to otherwise improve the action.

This frame-work may be finished in any suitable or desirable style, either polished and nickel-plated or covered with leather or any suitable covering material.

Having thus described my invention, what I claim as new, and desire to secure by Letters Patent, is—

A device or spreader having a bar B, adapted to extend centrally along the horse's back and connected with the surcingle and crupper, in combination with arms or branches having swiveled or jointed extensions and loops or straps adapted to be passed around the hind legs of the horse and connected with the lower ends of the branches, said arms or branches being elastic and adapted to exert a side pull upon the legs of the horse and cause the horse to travel with his legs apart, substantially as herein described.

In witness whereof I have hereunto set my hand.

JAMES R. PHELPS.

Witnesses:
S. H. NOURSE,
H. C. LEE.